United States Patent [19]

Katoh

[11] Patent Number: 5,925,592
[45] Date of Patent: Jul. 20, 1999

[54] PROCESS FOR PREPARING ALUMINA CARRIER

[76] Inventor: Akira Katoh, c/o Japan Energy Corporation, 17-35, Niizominami 3-chome, Toda-shi Saitama 335, Japan

[21] Appl. No.: 08/849,442

[22] PCT Filed: Oct. 3, 1996

[86] PCT No.: PCT/JP96/02870

§ 371 Date: Jun. 2, 1997

§ 102(e) Date: Jun. 2, 1997

[87] PCT Pub. No.: WO97/12670

PCT Pub. Date: Apr. 10, 1997

[51] Int. Cl.⁶ .................................................. B01J 21/04
[52] U.S. Cl. ............................................ 502/439; 423/628
[58] Field of Search ............................ 502/439, 527.14; 423/628

[56] References Cited

U.S. PATENT DOCUMENTS

| | | | |
|---|---|---|---|
| 2,950,169 | 8/1960 | Murray et al. | 423/628 |
| 3,850,849 | 11/1974 | Kiovsky et al. | 502/439 |
| 3,912,658 | 10/1975 | Kaneko et al. | 502/439 |
| 4,036,784 | 7/1977 | Gembicki et al. | 502/439 |
| 4,224,302 | 9/1980 | Ohamoto et al. | 423/628 |
| 4,248,852 | 2/1981 | Wakabayashi et al. | 423/626 |
| 4,260,524 | 4/1981 | Yamada et al. | 252/463 |
| 5,110,783 | 5/1992 | Yamaguchi et al. | 502/314 |
| 5,208,206 | 5/1993 | Yasaki et al. | 423/213.5 |
| 5,215,955 | 6/1993 | Threlkel | 502/221 |
| 5,266,300 | 11/1993 | Harrison | 423/628 |
| 5,733,842 | 3/1998 | Gerdes et al. | 502/439 |

FOREIGN PATENT DOCUMENTS

| | | | |
|---|---|---|---|
| 967986 | 5/1975 | Canada . | |
| 0 387 394 | 9/1990 | European Pat. Off. | 502/439 |
| 0 395 203 | 10/1990 | European Pat. Off. . | |
| 2 214 401 | 10/1972 | Germany . | |
| 2 318 518 | 12/1973 | Germany . | |
| 29 32 648 | 2/1980 | Germany . | |
| 50-98486 | 8/1975 | Japan . | |
| 3-8445 | 1/1991 | Japan . | |
| 4-27436 | 1/1992 | Japan . | |
| 4-42809 | 2/1992 | Japan | 502/439 |
| 4-235737 | 8/1992 | Japan . | |
| 6-205990 | 7/1994 | Japan . | |
| 2 031 394 | 4/1980 | United Kingdom | 502/439 |
| 92/02456 | 2/1992 | WIPO | 502/439 |

*Primary Examiner*—Ngoc-Yen Nguyen
*Attorney, Agent, or Firm*—Klima & Pezzlo, PC

[57] ABSTRACT

An alumina catalyst carrier is prepared by using an alumina material comprising 90 to 20% by weight of alumina as particles having an aspect ratio of 1 to 5, and 10 to 80% by weight of alumina as particles having an aspect ratio of more than 10 but less than 10,000; kneading and forming the alumina material, and then calcining the formed product. The resulting catalyst carrier has high strength, and has such a pore diameter distribution as to give satisfactory catalytic activity.

9 Claims, No Drawings

PROCESS FOR PREPARING ALUMINA CARRIER

TECHNICAL FIELD

This invention relates to a process for preparing an alumina carrier for use as a carrier for various catalysts. More specifically, the invention relates to a process for preparing a high-strength, high-activity alumina catalyst carrier from alumina having an aspect ratio of 1 to 5 and alumina having an aspect ratio of more than 10 but less than 10,000.

BACKGROUND ART

Preparation of an alumina catalyst carrier from alumina generally uses a step of kneading an alumina material, a step of forming the kneaded material into a desired shape (such as cylinder, pellet or honeycomb) and a desired size, a step of drying the formed product at a temperature of 80 to 150° C., and a step of calcining the dried product in a calciner at a calcination temperature of 400 to 1,000° C.

Such an alumina catalyst carrier is required to have high activity and high strength. It is difficult to fulfill both of these requirements, and attempts have been made to do so. Japanese Laid-Open Patent Publication No. 8445/91 of the applicant, for example, discloses a process for preparing an alumina carrier which comprises adding an acid to a slurry consisting of an alumina hydrate and water to make pH 2.0–3.0, then adding an alkali to adjust the pH of the slurry to 3.5–6.0, and then separating an alumina hydrogel prior to the kneading of a starting alumina powder. The use of this method makes it possible to adjust the pore diameters of an alumina carrier, thereby improving the activity of a catalyst.

Japanese Laid-Open Patent Publication No. 235737/92 discloses a method comprising pressure molding water-containing alumina, followed by an aging and calcining process. This method is described as being capable of obtaining an alumina carrier having pores of 1,000 angstroms or more in diameter and having high mechanical strength. This publication, moreover, discloses a method which involves impregnating the alumina carrier with an aqueous solution of an aluminum salt, followed by a drying and calcining process, to further enhance its mechanical strength.

Japanese Laid-Open Patent Publication No. 98486/75 discloses a process for preparing a high-strength, high-activity alumina catalyst carrier by adding an acidic substance, such as acetic acid, and water to alumina, kneading them, forming the mixture, and calcining the formed product.

Japanese Laid-Open Patent Publication No. 27436/92 discloses a hydrogenation catalyst using an alumina catalyst in which the lengths of alumina particles after forming and calcination steps have a predetermined distribution. This publication also discloses a process for preparing the hydrogenation catalyst. This process is described as being excellent in desulfurization activity.

Japanese Laid-Open Patent Publication No. 205990/94 discloses the production of a high-activity catalyst for the hydrogenation and desulfurization of a metal-containing heavy oil by use of an alumina carrier having a specific pore diameter distribution. In Example A of this publication, an alumina material comprising two kinds of alumina particles, Catapal alumina and Versal 250 alumina is used for the preparation of a catalyst carrier. No mention is made, however, of the aspect ratios of these alumina particles.

An alumina catalyst carrier is required to have pore diameters of about several tens of nanometers and a narrow pore diameter distribution in order to achieve improved catalytic activity. To produce a catalyst carrier having such characteristics, it is desirable to use the starting alumina particles with an aspect ratio of 5 or less. The catalyst carrier, however, should also have a large specific surface area and pore volume to have high catalytic activity, thus making it impossible to proceed fully with the sintering of the particles. Thus, when particles with an aspect ratio of 1 to 5 are used as an alumina material, such particles can be joined to each other only at the site of contact between the particles at the time of calcination. The resulting catalyst carrier is so low in mechanical strength as to undergo chipping or dusting.

When fibrous particles having an aspect ratio of greater than 10 are used as the starting material, on the other hand, the fibrous particles are entangled during kneading, thus increasing the strength of the resulting catalyst carrier. This effect increases as the aspect ratio becomes higher. The carrier using such a starting material is low in catalytic activity because of a broad pore diameter distribution.

The object of the present invention is to provide a process for preparing an alumina catalyst carrier having sufficient mechanical strength, being capable of imparting high catalytic activity, and minimally undergoing chipping or dusting.

DISCLOSURE OF INVENTION

To attain this object, the inventors have focused on alumina materials, and conducted extensive studies. As a result, they have succeeded in easily producing an alumina catalyst carrier with a desired range of pore diameter distribution and improved mechanical strength by using an alumina material containing alumina and fibrous alumina in predetermined proportions, the alumina being particles having an aspect ratio of 1 to 5, and the fibrous alumina being particles having an aspect ratio of greater than 10.

The present invention provides a process for preparing an alumina carrier by kneading and forming an alumina material, and then calcining the formed product, characterized in that;

the alumina material is composed of 90 to 20% by weight of alumina being particles having an aspect ratio of 1 to 5, and 10 to 80% by weight of alumina being particles having an aspect ratio of more than 10 but less than 10,000.

The alumina material used in the process of the present invention is composed of 90 to 20% by weight of alumina being particles having an aspect ratio of 1 to 5, and 10 to 80% by weight of alumina being particles having an aspect ratio of more than 10 but less than 10,000. In this specification, the proportions (% by weight) of aluminas in the alumina material refer to their proportions to all aluminas in the material. If the proportion of the alumina being particles having an aspect ratio of more than 10 but less than 10,000 is less than 10% by weight, there will be no marked improvement in the strength of the alumina carrier after sintering. If the proportion of the alumina being particles having an aspect ratio of more than 10 but less than 10,000 exceeds 80% by weight, the pore diameter distribution of the resulting alumina carrier will be broad, resulting in unsatisfactory catalytic activity. To suppress the broadening of the pore diameter distribution of the alumina carrier, the aspect ratio of the particles of the alumina used should be less than 10,000. To emphasize catalytic activity, it is desirable to use alumina being particles having an aspect ratio of 1,000 or less, preferably 200 or less, and more preferably 100 or less.

Under these circumstances, a more preferable composition of the alumina material is 80 to 50% by weight of alumina being particles having an aspect ratio of 1 to 5, and 20 to 50% by weight of alumina being particles having an aspect ratio of more than 10 but less than 10,000; and more preferably 80 to 65% by weight of alumina being particles having an aspect ratio of 1 to 5, and 20 to 35% by weight of alumina being particles having an aspect ratio of more than 10 but less than 1,000.

The term "particles of alumina" used herein refers to primary particles of alumina, or secondary particles resulting when the primary particles are agglomerated and oriented in a certain direction. Thus, the particles whose agglomerate is easily dispersed into primary particles refer to primary particles of alumina; whereas the particles whose agglomerate is not dispersed mean secondary particles of alumina.

The term "the aspect ratio" used herein is the ratio of the major-axis length to the minor-axis length of the particle. For example, the aspect ratio can be determined by observing the particles with a transmission electron microscope or the like, randomly sampling 10 of the particles present in the image field, measuring the ratio of the major-axis length to the minor-axis length of each particle, and calculating the average of the values. Thus, the lower limit of the aspect ratio is 1.

The alumina particles having an aspect ratio of 1 to 5, and alumina particles having an aspect ratio of more than 10 but less than 10,000 that constitute the alumina material are commercially available. Alternatively, these aluminas with different aspect ratios can be synthesized under adjusted reaction conditions by a wet process, such as hydrolysis of an aluminum alkoxide, or neutralization between an acidic aluminum source, such as aluminum sulfate, aluminum nitrate or aluminum chloride, and a basic aluminum source, such as aluminum hydroxide or sodium aluminate. Preferred alumina is, although not restricted to, pseudo-boehmite type alumina, and alumina such as bialite or gibbsite may be used.

The above commercially available or synthesized alumina particles having an aspect ratio of 1 to 5, and alumina particles having an aspect ratio of more than 10 but less than 10,000, are mixed in the aforementioned proportions to give the alumina material. Alternatively, during the kneading of the alumina material, alumina having one of the aspect ratio ranges may be added so as to form the aforesaid composition, while alumina having the other aspect ratio range is being kneaded. Each alumina may be in the form of a hydrate, a hydrous alumina cake of the hydrate, or an alumina slurry thereof.

Those two types of aluminas different in the aspect ratio range can be directly synthesized in the following manner: For the preparation of the alumina particles having an aspect ratio of 1 to 5, aluminum sulfate as an acidic aluminum source and sodium aluminate as a basic aluminum source are neutralized and aged. Then, the precipitate is washed and filtered. The alumina particles having an aspect ratio of more than 10 but less than 10,000, on the other hand, can be prepared from an alumina hydrate that has been obtained by the neutralization of an acidic aluminum source with a basic aluminum source, or an acidic aluminum source with a basic aqueous solution, or an acidic solution with a basic aluminum source. Examples of the acidic aluminum source are aluminum chloride, and chloride ion-containing aluminum sulfate. Examples of the basic aluminum source include sodium aluminate.

The resulting cake may be subjected, as such, to kneading, or slurried with the addition of water and dried with a spray dryer to form a powder. The latter method is favorable because it facilitates controlling of the conditions used during kneading.

According to a preferred embodiment of the present invention, it is preferred to use for the alumina material of the invention an alumina hydrate as primary particles having an aspect ratio of 1 to 5, or a hydrous alumina cake or an alumina slurry of the alumina hydrate; and a hydrous alumina cake or an alumina slurry which is prepared from an alumina hydrate synthesized by the wet process and which has an aspect ratio of 10 to 10,000 in the form of primary particles.

In accordance with the process for production of the alumina carrier of the invention, the alumina material prepared in the above manner is kneaded. Normally, an acid or an alkali is added as a deflocculant, whereafter water is added to impart a water content for formability, followed by kneading the mixture. An acidic solution or an alkaline solution capable of deflocculating the alumina material is used for this purpose. Examples of acids for the acidic solution are inorganic acids such as nitric acid, sulfuric acid and hydrochloric acid, and organic acids such as acetic acid, citric acid and oxalic acid. Nitric acid and organic acids are particularly preferred since they leave no residues during a subsequent calcination step. Examples of alkalis for the alkaline solution are ammonia, quaternary ammonium hydroxides such as tetrapropylammonium hydroxide, sodium hydroxide, potassium hydroxide, and sodium aluminate. Particularly preferred are ammonia and quaternary ammonium hydroxides, which leave no residues during the subsequent calcination step.

The kneading step may be performed in the following manner with the addition of an acid or an alkali within a specific pH range in place of water: An acidic or alkaline solution is added as a deflocculant to the alumina particles at the initial stage of kneading, followed by kneading the mixture while adding an acidic solution with a pH 3 or less or an alkaline solution with a pH 11 or more. Research by the inventors showed that kneading with the use of the solution within the above pH range increased the strength of the calcined alumina carrier by about 25% to about 60% over kneading with the use of water. For the use of the acidic solution, pH 1 or less is particularly preferred. In the case of the alkaline solution, those with a pH of 13 or more are particularly preferred. The solubility of alumina has been found the lowest with use of pH 5, and found to increase as the pH becomes more acidic or more alkaline than this value. The acid or alkali as an alternative to water may be the aforementioned type of acidic or alkaline solution.

The kneaded alumina particles are generally formed into a suitable size and a suitable shape by a forming machine. Then, the formed product is dried, for example, for 10 minutes to a whole day at a temperature of 80 to 150° C. by means of a dryer. Then, the dried product is calcined at a temperature of, say, 400 to 1,000° C. in a calciner.

BEST MODE FOR CARRYING OUT THE INVENTION

The process for preparing an alumina carrier of the present invention will now be described by way of Examples, but the invention is in no way limited thereto.

Example 1

As alumina, there was used 1,800 g of commercially available pseudo-boehmite formed from particles having an aspect ratio of 1 to 5 (average 2.0), the boehmite being called alumina A. Alumina A was mixed with 200 g of commercially available pseudo-boehmite formed from particles having an aspect ratio of 30 to 100 (average 58), the boehmite being called alumina B, to prepare an alumina material. The proportion of alumina B mixed was 10% by weight. At the initial stage of kneading the alumina material, 1 liter of 3.3% nitric acid was added as a deflocculant. Then, while kneading the mixture, water was added where necessary to adjust the water content of a final dough to 45 to 60% by weight. After kneading for 2 hours, the dough was formed into a columnar shape 1 mm in diameter by a twin-screw extruder. The formed product was dried in a dryer for 20 hours at 130° C. Then, after drying the pellets were calcined in a calciner for 1 hour at 600° C. to obtain an alumina catalyst carrier.

The average flexural strength and side collapse strength (SCS) of the alumina catalyst carrier were measured with a universal tension/compression tester and a Toyama tablet strength measuring machine, respectively. The average flexural strength was 10.2 MPa, and the SCS was 1.9 kg. Measurement was also made of a value on which the lengths of the alumina carrier dropped several times from a height of 2 m onto a stainless steel plate converged (convergent length). The convergent length expressed as the average of the alumina carrier lengths after the 5th and the 7th dropping was 2.1 mm. Preliminary experiments showed the convergent length of the alumina carrier becomes larger in proportion to the increase in the flexural strength of the alumina carrier. The results are shown in Table 1. In Table 1, the mixing ratio (% by weight) is the proportion (% by weight) of the alumina particles having an aspect ratio of 1 to 5 to all aluminas contained in the starting powdery material.

TABLE 1

|  | Mixing ratio of alumina particles having aspect ratio of 1 to 5 (wt. %) | Flexural strength (MPa) | SCS (kg) | Convergent length (mm) |
| --- | --- | --- | --- | --- |
| Ex. 1 | 90 | 10.2 | 2.2 | 2.3 |
| Ex. 2 | 70 | 11.8 | 2.6 | 2.5 |
| Ex. 3 | 50 | 15.5 | 3.0 | 2.8 |
| Ex. 4 | 20 | 20.0 | 3.3 | 3.1 |
| Ex. 5 | 80 | 14.3 | 3.1 | 2.9 |
| Comp. Ex. 1 | 100 | 8.6 | 1.9 | 2.1 |
| Comp. Ex. 2 | 0 | 21.5 | 3.5 | 3.2 |

Example 2

The alumina material was kneaded, formed, dried and calcined in the same way as in Example 1, except that the proportion of alumina B mixed was 30% by weight. The resulting alumina carrier was measured for the average flexural strength, SCS and convergent length in the same manner as in Example 1. The results are shown in Table 1.

Example 3

The alumina material was kneaded, formed, dried and calcined in the same way as in Example 1, except that the proportion of alumina B in the alumina material was 50% by weight. The resulting alumina carrier was measured for the average flexural strength, SCS and convergent length in the same manner as in Example 1. The results are given in Table 1.

Example 4

The alumina material was kneaded, formed, dried and calcined in the same way as in Example 1, except that the proportion of alumina B in the alumina material was 80% by weight. The resulting alumina carrier was measured for the average flexural strength, SCS and convergent length in the same manner as in Example 1. The results are presented in Table 1.

Example 5

There were prepared 12 liters of a 0.25M aqueous solution of aluminum sulfate as an acidic aluminum source, and 9.5 liters of a 0.5M aqueous solution of sodium aluminate as a basic aluminum source. After 20 liters of water were added to the aqueous aluminum sulfate solution, the aqueous sodium aluminate solution was added at 25° C. to carry out the neutralization reaction. The reaction was controlled so that the pH when neutralization took place would be 7.0±0.2. After the reaction, the temperature of the reaction mixture was held at 80° C., followed by adding an aqueous solution of sodium hydroxide to adjust the pH to 10. The mixture was aged for 20 hours with stirring. Then, the aged mixture was washed and filtered to obtain an alumina cake in which the particles had an aspect ratio of 1 to 5 (average 2.3), the alumina cake being called alumina C.

Then, 12 liters of a 0.5M aqueous solution of aluminum chloride as an acidic aluminum source, and 9.5 liters of a 0.5M aqueous solution of sodium aluminate as a basic aluminum source were prepared. After 20 liters of water were added to the aqueous aluminum chloride solution, the aqueous sodium aluminate solution was added at 70° C. to carry out the neutralization reaction. The reaction was controlled so that the pH when neutralization took place would be 8.3±0.2. After the reaction, the temperature of the reaction mixture was held at 80° C., followed by adding an aqueous solution of sodium hydroxide to adjust the pH to 9. The mixture was aged for 20 hours with stirring. Then, the aged mixture was washed and filtered to obtain an alumina cake in which the particles had an aspect ratio of 30 to 80 (average 48), the alumina cake being called alumina D.

Water was added to the alumina C cake (80% by weight as a dry powder) and the alumina D cake (20% by weight as a dry powder), followed by mixing, to form an alumina slurry. Then, the alumina slurry was dried with a spray dryer to obtain an alumina powder containing two kinds of aluminas with different aspect ratio ranges in the above proportions. The obtained alumina powder was used as the starting powdery material instead of the staring powdery material used in Example 1. The alumina powder was kneaded, formed, dried and calcined in the same way as in Example 1. The resulting alumina carrier was measured for the average flexural strength, SCS and convergent length in the same manner as in Example 1. The results are given in Table 1.

Comparative Example 1

The alumina material was kneaded, formed, dried and calcined in the same way as in Example 1, except that only alumina A was used, and alumina B was not mixed. The resulting alumina carrier produced only from alumina A was measured for the average flexural strength, SCS and convergent length in the same manner as in Example 1. The results are given in Table 1.

Comparative Example 2

The alumina material was kneaded, formed, dried and calcined in the same way as in Example 1, except that only alumina B was used as the alumina material. The resulting alumina carrier was measured for the average flexural strength, SCS and convergent length in the same manner as in Example 1. The results are shown in Table 1.

In the Examples 1 to 5 and Comparative Examples 1 and 2, the total weight of the alumina material was identical.

Determination of Pore Diameter Distribution

The pore diameter distributions of the alumina catalyst carriers obtained in the Examples 1 to 5 and Comparative Examples 1 and 2 were investigated using ASAP2400 (Micromellitex). Table 2 shows the rates of the pore volumes within specific pore diameter ranges to the total pore volume. The higher their values are, the more concentrated the pores are in specific ranges. This means a sharper pore diameter distribution and better catalytic activity. In Table 2, the pore diameters of the catalyst carriers obtained when the mixing ratio of alumina B was up to 80% by weight were distributed in narrow ranges of from 80 to 120 angstroms. When the alumina material was composed entirely of alumina B (Comp. Ex. 2), by contrast, the pore diameter distribution was broad. Example 5, using alumina D with a lower aspect ratio compared to alumina B, tended to give a sharp pore diameter distribution and sufficient strength.

TABLE 2

| | Mixing ratio of alumina particles having aspect ratio of 1 to 5 (wt. %) | Pore volume rate (%) | |
|---|---|---|---|
| | | Pore diameter 90–110 Å | Pore diameter 80–120 Å |
| Ex. 1 | 90 | 52 | 70 |
| Ex. 2 | 70 | 46 | 64 |
| Ex. 3 | 50 | 41 | 61 |
| Ex. 4 | 20 | 31 | 54 |
| Ex. 5 | 80 | 51 | 69 |
| Comp. Ex. 1 | 100 | 54 | 72 |
| Comp. Ex. 2 | 0 | 23 | 45 |

Industrial Availability

As described above, an alumina carrier obtained in the present invention by using an alumina material comprising 90 to 20% by weight of alumina being particles having an aspect ratio of 1 to 5, and 10 to 80% by weight of alumina being particles having an aspect ratio of greater than 10 but less than 10,000 has improved mechanical strength, and sufficient pore diameter distribution to impart satisfactory catalytic activity. The use of alumina prepared in Example 5 fulfills both of desired carrier strength and desired pore diameter distribution. Thus, the process for preparing the alumina carrier of the present invention is very effective for producing a catalyst having high strength and satisfactory catalytic activity.

I claim:

1. A process for preparing an alumina carrier by kneading and forming an alumina material, and then calcining the formed product characterized in that;

said alumina material is composed of 90 to 20% by weight of pseudo-boehmite particles having an aspect ratio of 1 to 5, and 10 to 80% by weight of pseudo-boehmite particles having an aspect ratio of more than 10 but less than 10,000.

2. The process of claim 1, wherein said pseudo-boehmite particles having the aspect ratio of 1 to 5 are added to said pseudo-boehmite particles having the aspect ratio of more than 10 but less than 10,000 while said pseudo-boehmite particles having the aspect ratio of more than 10 but less than 10,000 are being kneaded.

3. The process of claim 1, wherein said alumina material is prepared by mixing said pseudo-boemite particles having the aspect ratio of 1 to 5 and said pseudo-boemite particles having the aspect ratio of more than 10 but less than 10,000.

4. The process of claim 1, wherein said alumina material is prepared by using a hydrous alumina cake or slurry of said pseudo-boehmite particles having the aspect ratio of 1 to 5 and a hydrous alumina cake or slurry of said pseudo-boehmite particles having the aspect ratio of more than 10 but less than 10,000.

5. The process of claim 4, wherein said hydrous alumina cake or slurry of said pseudo-boehmite particles having the aspect ratio of more than 10 but less than 10,000 has been prepared from an alumina hydrate obtained by the neutralization reaction between an acidic aluminum source and a basic aluminum source, or an acidic aluminum source and a basic aqueous solution, or an acidic aqueous solution and a basic aluminum source.

6. The process of claim 4, wherein said pseudo-boehmite particles having the aspect ratio of 1 to 5 and said pseudo-boehmite particles having the aspect ratio of more than 10 but less than 10,000 are each obtained through a wet process.

7. The process of claim 1, wherein said pseudo-boehmite particles having the aspect ratio of more than 10 but less than 10,000 are added to said pseudo-boehmite particles having the aspect ratio of 1 to 5 while said pseudo-boehmite particles having the aspect ratio of 1 to 5 are being kneaded.

8. A process for preparing an alumina carrier by kneading and forming an alumina material, and then calcining the formed product characterized in that;

said alumina material is composed of 90 to 20% by weight of pseudo-boehmite particles having an aspect ratio of 1 to 5, and 10 to 80% by weight of pseudo-boehmite particles having an aspect ratio of more than 10 but less than 200.

9. The process of claim 8, wherein said alumina material is composed of 80 to 50% by weight of said pseudo-boehmite particles having the aspect ratio of 1 to 5, and 20 to 50% by weight of said pseudo-boehmite particles having the aspect ratio of more than 10 but less than 200.

* * * * *